(12) United States Patent
Tschuor et al.

(10) Patent No.: US 9,708,920 B2
(45) Date of Patent: Jul. 18, 2017

(54) GAS TURBINE SUPPORT ELEMENT PERMITTING THERMAL EXPANSION BETWEEN COMBUSTOR SHELL AND ROTOR COVER AT TURBINE INLET

(71) Applicant: ALSTOM Technology Ltd, Baden (CH)

(72) Inventors: Remigi Tschuor, Windisch (CH); Sinisa Narancic, Tusilovic (HR); Guenter Filkorn, Nussbaumen (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 40 days.

(21) Appl. No.: 14/254,985

(22) Filed: Apr. 17, 2014

(65) Prior Publication Data

US 2014/0223921 A1 Aug. 14, 2014

Related U.S. Application Data

(63) Continuation of application No. PCT/EP2012/070930, filed on Oct. 23, 2012.

(30) Foreign Application Priority Data

Oct. 24, 2011 (EP) .................................... 11186387

(51) Int. Cl.
*F23R 3/60* (2006.01)
*F01D 9/02* (2006.01)
(Continued)

(52) U.S. Cl.
CPC ............ *F01D 9/023* (2013.01); *F01D 25/28* (2013.01); *F02C 7/20* (2013.01); *F23R 3/002* (2013.01);
(Continued)

(58) Field of Classification Search
CPC .... F23R 3/60; F23R 3/54; F23R 2900/00005; F23R 2900/00012; F23R 2900/00017; F01D 9/23; F02C 7/20
(Continued)

(56) References Cited

U.S. PATENT DOCUMENTS 2,592,060 A * 4/1952 Oulianoff ................ F01D 9/023
285/223
3,186,168 A 6/1965 Ormerod et al.
(Continued)

FOREIGN PATENT DOCUMENTS

EP 1160512 A2 12/2001
EP 896193 B1 * 9/2003
(Continued)

OTHER PUBLICATIONS

Office action issued from Russian Patent Office dated Dec. 2, 2015 for RU Application No. 2014120759.
(Continued)

*Primary Examiner* — Pascal M Bui Pho
*Assistant Examiner* — Marc Amar
(74) *Attorney, Agent, or Firm* — GE Global Patent Operations; Marc A. Vivenzio

(57) ABSTRACT

A gas turbine includes a compressor, an annular combustion chamber, and a turbine, a combustion chamber shell of the combustion chamber adjoining the turbine inlet in a transition region in order to introduce the hot gases generated in the combustion chamber into the downstream turbine such that a thermal expansion-induced relative movement between the combustion chamber and the turbine inlet is possible. Combustion chamber shell support elements distributed on the periphery come into contact with a conical contour on the shaft cover due to the thermal expansion that occurs during operation and are supported on said contour.

(Continued)

An improvement with respect to loading and service life is achieved in that the conical contour and the machine axis form an angle that allows the combustion chamber shell support elements to slide onto the conical contour.

19 Claims, 4 Drawing Sheets

(51) Int. Cl.
  *F02C 7/20* (2006.01)
  *F01D 25/28* (2006.01)
  *F23R 3/00* (2006.01)

(52) U.S. Cl.
  CPC ...... *F23R 3/60* (2013.01); *F23R 2900/00012* (2013.01)

(58) Field of Classification Search
  USPC .................. 60/752–760, 796–800; 431/343
  See application file for complete search history.

(56) References Cited

U.S. PATENT DOCUMENTS

| | | | | |
|---|---|---|---|---|
| 3,481,146 | A * | 12/1969 | Jackson | F23R 3/60 60/800 |
| 3,670,467 | A | 6/1972 | Walker | |
| 3,670,497 | A | 6/1972 | Sheldon | |
| 3,928,963 | A * | 12/1975 | Devers | F01D 25/14 415/178 |
| 4,821,522 | A * | 4/1989 | Matthews | F01D 9/023 415/175 |
| 4,901,522 | A * | 2/1990 | Commaret | F23R 3/08 60/752 |
| 5,265,412 | A * | 11/1993 | Bagepalli | F01D 9/023 277/355 |
| 5,271,714 | A * | 12/1993 | Shepherd | F01D 25/246 415/189 |
| 6,442,946 | B1 | 9/2002 | Kraft et al. | |
| 6,450,762 | B1 * | 9/2002 | Munshi | F01D 9/023 415/138 |
| 6,860,108 | B2 * | 3/2005 | Soechting | F01D 9/023 60/39.37 |
| 7,082,766 | B1 | 8/2006 | Widener et al. | |
| 7,178,340 | B2 * | 2/2007 | Jorgensen | F01D 11/003 415/138 |
| 8,347,636 | B2 * | 1/2013 | Butkiewicz | F01D 9/023 60/752 |
| 2003/0101561 | A1 * | 6/2003 | Kefalas | B23P 6/002 29/402.02 |
| 2003/0167776 | A1 | 9/2003 | Coppola | |
| 2004/0261419 | A1 * | 12/2004 | McCaffrey | F23M 5/04 60/796 |
| 2005/0129499 | A1 * | 6/2005 | Morris | F01D 9/04 415/1 |
| 2006/0010879 | A1 * | 1/2006 | Aumont | F01D 9/023 60/796 |
| 2007/0125063 | A1 * | 6/2007 | Evulat | 60/39.15 |
| 2007/0237630 | A1 * | 10/2007 | Schiavo | F01D 5/225 415/179 |
| 2008/0008583 | A1 * | 1/2008 | Suciu | F01D 9/042 415/208.1 |
| 2008/0008584 | A1 * | 1/2008 | Shteyman | F01D 25/246 415/209.2 |
| 2010/0307166 | A1 * | 12/2010 | Woodcock | F01D 9/023 60/796 |
| 2011/0135451 | A1 * | 6/2011 | Tschuor | F01D 9/023 415/170.1 |
| 2015/0167979 | A1 * | 6/2015 | Siden et al. | F23R 3/16 |
| 2015/0292742 | A1 * | 10/2015 | Spence et al. | F23R 3/16 |

FOREIGN PATENT DOCUMENTS

| | | | |
|---|---|---|---|
| EP | 0896193 B1 | 9/2003 | |
| EP | 2249003 A1 | 11/2010 | |
| EP | 2249003 A1 | 11/2010 | |
| GB | 638807 A | 6/1950 | |
| GB | 1018479 A | 1/1966 | |
| GB | 2102897 A * | 2/1983 | ............ F01D 9/023 |
| JP | 2002-517673 A | 6/2002 | |
| RU | 2275554 C2 | 4/2006 | |
| WO | 02/27168 A1 | 4/2002 | |
| WO | 2009/103658 A1 | 8/2006 | |

OTHER PUBLICATIONS

PCT Search Report and Written Opinion issued in connection with corresponding PCT Application No. PCT/EP2012/070930 on Jan. 12, 2015.

RU Notice of allowance Office Action issued in connection with corresponding RU Application No. 2014120759 on Mar. 24, 2016.

* cited by examiner

GAS TURBINE SUPPORT ELEMENT PERMITTING THERMAL EXPANSION BETWEEN COMBUSTOR SHELL AND ROTOR COVER AT TURBINE INLET

CROSS-REFERENCE TO RELATED APPLICATIONS

This application claims priority to PCT/EP2012/070930 filed Oct. 23, 2012, which claims priority to European application 11186387.4 filed Oct. 24, 2011, both of which are hereby incorporated in their entireties.

TECHNICAL FIELD

The present invention relates to the field of gas turbines. It relates to the transition region between an annular combustor and a downstream turbine.

BACKGROUND

The present invention proceeds from a gas turbine which in the simplest case has a diagram as reproduced in FIG. 1. The gas turbine 10 of FIG. 1 comprises a compressor 12, a combustor 13 and a turbine 15. Combustion air is drawn in, via an air intake 11, and compressed by the compressor 12. The compressed air is introduced into the combustor 13, where it is used for the combustion of a fuel 14. The hot gas produced is expanded in the downstream turbine 15, performing work, and leaves the turbine 15 as exhaust gas 16.

Modern (stationary) industrial gas turbines (IGTs) are generally configured with annular combustors. In the case of generally smaller IGTs, the combustors are embodied as what are termed "can-annular combustors".

In the case of an IGT having an annular combustor, the combustion space is bounded by the sidewalls and the inlet and outlet planes of the hot gas. The combustor sidewalls are in this case either of segmented construction, being composed of shell elements, or are constructed as whole shells. When using whole shells, it is necessary for assembly to have a separating plane by means of which the upper part can be removed, in order for example to assemble or disassemble the gas turbine rotor. The separating plane accordingly has two separating plane weld seams which are, for example, at the level of the machine axis (at the 3 o'clock and 9 o'clock positions). The lower and upper half-shells must inter alia be convectively cooled.

Function of the Combustor Shells

The combustor shells ("combustor transition duct") have the following functions:

They seal off two plena/chambers.
They also have to seal with respect to one another (assembly by means of a separating plane, generally at the 3 o'clock and 9 o'clock positions).
They are of rotationally symmetric design, with the exception of the separating plane.
They must be guided into/onto one another in the separating plane during assembly of the combustor half-shells.
The combustor inner shells or the inner combustor shells must be guided into one another "blind" at the separating plane (no access for a visual inspection of the connection plane as this plane is covered by the combustor inner shells).
They should not have to take up any axial or radial forces.
They may, but need not necessarily, be designed to be self-supporting (no supporting structure).
They must have (considerable) axial and radial freedom of movement, in particular during transient operative states.
They must be thermally stable (creep strength/fatigue strength).
Harmonic oscillations should be damped where possible (support for the shells).

FIG. 2 shows a section, comprising the combustor, of an exemplary gas turbine having an annular combustor. The outlet of the compressor 12 with its guide vanes and rotor blades is shown here on the right; on the opposite side is the inlet region of the turbine 15 with its guide vanes and rotor blades. Between the compressor outlet and the turbine inlet region there is a rotor cover 25 which surrounds the rotor 17. The inlet region of the rotor cover is configured as a compressor-diffuser having a flow cross section which increases in the flow direction and through which the compressed air flows into a plenum 18 which surrounds the annular combustor 13. The combustor 13 consists of an inner combustor shell 20a and an outer combustor shell 20b. Inner and outer cooling jackets 19a and 19b are arranged with separation on the respective outer sides of the combustor shells 20a,b and form with the associated combustor shell respectively an inner cool air feed 21a and an outer cool air feed 21b.

Air from the plenum 18 flows through these cool air feeds 21a,b into the inlet region upstream of the combustor 13, in which inlet region the actual burners 22 (in the present case what are termed double-cone burners) are arranged. The air fed in through the cool air feeds 21a,b enters the burners 22 on one side, where it is mixed with fuel. On the other side, air 24 enters the combustor directly through the rear wall 23 of the combustor 13. What is important for smooth operation of the gas turbine is the transition region, marked in FIG. 2 with a dotted circle and the reference sign A, between the combustor 13 and the turbine 15.

In operation, the inner and outer shells of the combustor are subject to high thermal and mechanical load. The material strength properties of the shells are very dependent on temperature. In order to keep this material temperature below the maximum permissible material temperature, the shell elements—as already described in conjunction with FIG. 2 and the cooling jackets 19a,b shown therein—are convectively cooled.

The shaping and the high thermal loading close to the turbine inlet require in particular in this region a constantly high heat transfer also on the cool air side. Both combustor shells reach, before the combustor is ignited, at least the temperature of the compressor outlet air. Once the burners are ignited, the metal temperature of both combustor shells increases further.

On account of the high metal temperature of the combustor shells, the shells expand axially and radially (see expansion direction 33 in FIG. 4). This expansion is easily measured in particular at the interface at the inlet of the turbine (inner and outer platform of the 1$^{st}$ guide vane row). This expansion occurs continuously and over a determined time period, during the startup process and in the event of changes in load on the gas turbine. The same process occurs in reverse during cooling down of the combustor (shrinkage).

In practice, it has now come to light that, by means of the type and configuration of the transition between combustor and turbine inlet as is described here, there result undesired abrasion marks or abrasion which must be avoided. As a consequence of the accompanying wear during operation of the gas turbine, the functionality is affected. Moreover, the lifespan is also affected or reduced. Finally, increased cost in reconditioning the machine is also to be expected.

SUMMARY

It is therefore an aspect of the invention to configure a gas turbine of the type mentioned in the introduction such that the drawbacks of the current solution are avoided and in particular the transient movements of the combustor shells are better taken up and supported.

The invention proceeds from a gas turbine which comprises a compressor, an annular combustor and a turbine, wherein, for the purpose of introducing the hot gases produced in the combustor into the downstream turbine, the combustor adjoins the turbine inlet in a transition region with a combustor shell. In order to make a relative movement, caused by thermal expansion, between the combustor and the turbine inlet possible, the combustor inner shell has attached support elements distributed around the periphery. As a result of the thermal expansion arising in operation, these support elements abut against a conical contour on the rotor cover and rest thereon.

One aspect of the invention is a conical contour which, with the machine axis, encloses an angle which allows the combustor inner shell with the support elements to slide over the conical contour.

In addition to the gas turbine, the combustor inner shell and the rotor cover for a gas turbine are the subject matter of the disclosure.

The combustor inner shell comprises, at the outlet end on the side facing away from the hot gases, attached support elements, which are distributed on the periphery and which have a bevel which in the installed state runs parallel to a conical contour of the rotor cover. The bevel, with the machine axis, encloses an angle which allows the support elements of the combustor inner shell to slide over the conical contour of the rotor cover.

The rotor cover for a gas turbine has, at the downstream end on the outer side, a conical contour which in the installed state, with the machine axis, encloses an angle. This angle allows a combustor inner shell with support elements to slide over the conical contour.

One embodiment of the gas turbine is distinguished by the fact that the support elements are designed as radially projecting, axially oriented support plates or fins, by the fact that the support plates or fins have a bevel opposite the conical contour and corresponding to the angle of the conical contour, and by the fact that a non-zero installation tolerance is provided between the conical contour and the bevel.

Another embodiment of the gas turbine is characterized in that as the combustor shell undergoes thermal expansion, this expansion occurs in an expansion direction which, with the conical contour, encloses a non-zero differential angle.

In particular, the differential angle is in the range between 2° and 15°, preferably in the range between 5° and 10°, in particular in the range between 7° and 8°, and the angle, which the conical contour and the machine axis enclose, is between 20° and 30°, in particular between 24° and 26°.

According to a further embodiment, the installation tolerance is in the range between 1 mm and 10 mm, preferably between 2 mm and 8 mm, in particular between 3 mm and 4 mm.

Another embodiment is characterized in that the rotor cover is made of gray cast iron and the support elements consist of a nickel-based alloy or a preferably austenitic ferritic steel.

Yet another embodiment is characterized in that the annular combustor is composed of individual segments, and in that two support elements are provided per segment.

BRIEF DESCRIPTION OF THE DRAWINGS

The invention will be described in more detail below on the basis of exemplary embodiments in conjunction with the drawing, in which.

DETAILED DESCRIPTION

Figure 1:
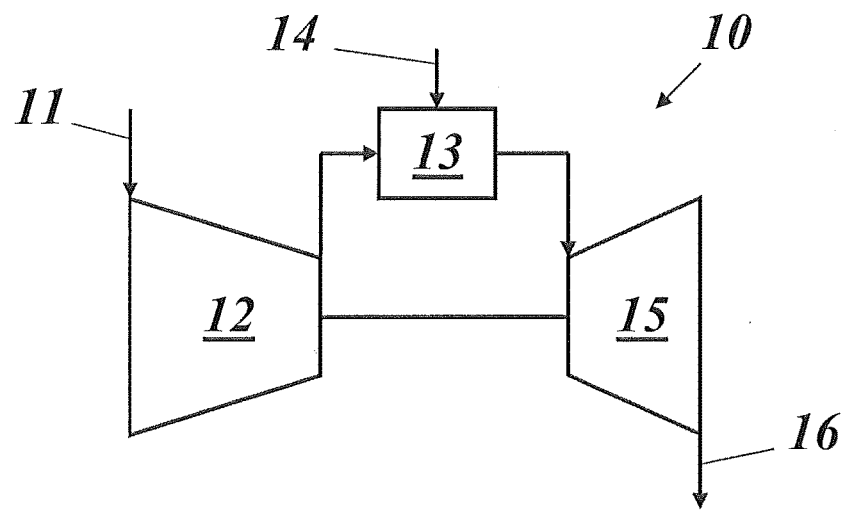
FIG. 1 shows the greatly simplified schematic diagram of a gas turbine.
Figure 2:
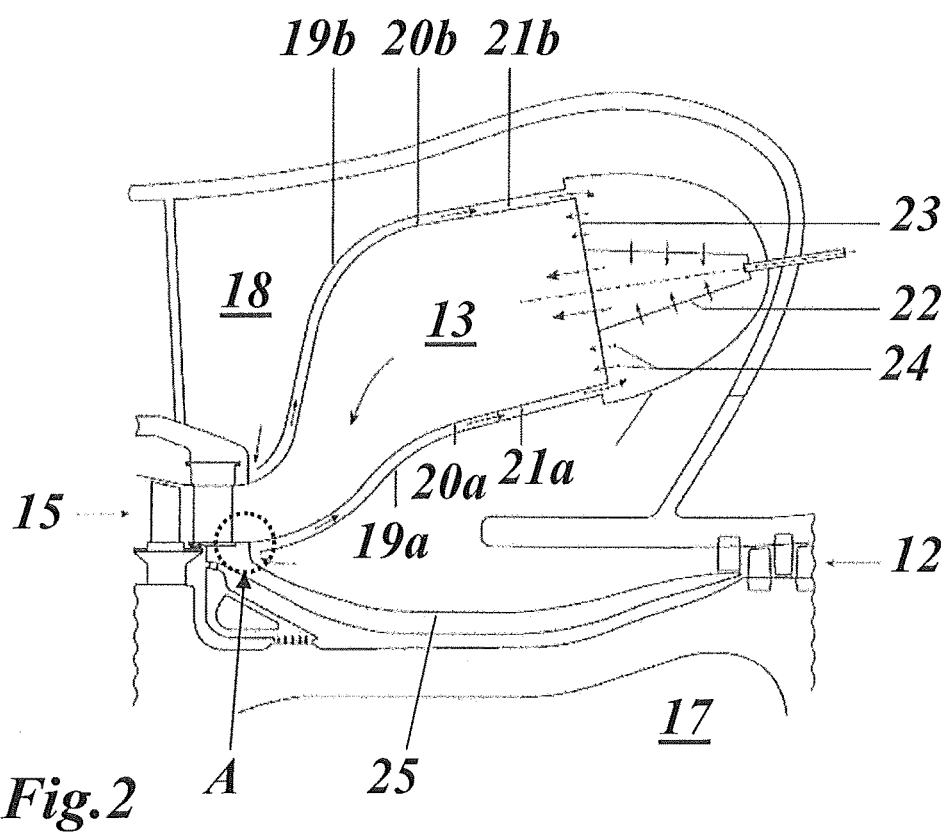
FIG. 2 shows, in section, the longitudinal section through a gas turbine having an annular combustor in the region of the combustor.

In the transition region A described in the introduction, the transition between the inner combustor shell 20a with its cooling jacket 19a and the inner wall of the turbine inlet (26 in FIG. 4) is now configured such that this transition allows and takes up a relative displacement caused by thermal expansion. The separation between the two components is bridged fluidically by means of plate-shaped transition elements (30 in FIG. 4) which on one side are mounted pivotably on the inner combustor shell 20a and on the other side are pressed at their free end against the outside of the inner wall of the turbine inlet 26, by means of pressure bolts (27 in FIG. 4) acted on by a compression spring (28 in FIG. 4), such that they can be displaced transversely to the axis of the pressure bolt 27. This produces a sealed-off transition for the hot gases between the combustor and the turbine inlet, which transition allows and compensates for a relative displacement of the two components with respect to one another.

In order that the combustor can perform no damaging vibrations during operation, means are provided in the transition region which allow the combustor to be supported on the rotor cover 25 when the operation-related thermal expansion of the combustor has concluded. These means comprise a plurality of radially protruding, axially oriented support plates (29 in FIG. 3, 4) which are arranged along the inner circumference of the inner combustor shell 20a. The support plates 29 have at the same time pivot bearings (32 in FIG. 3) for the pivotable transition elements 30.

Figure 3:
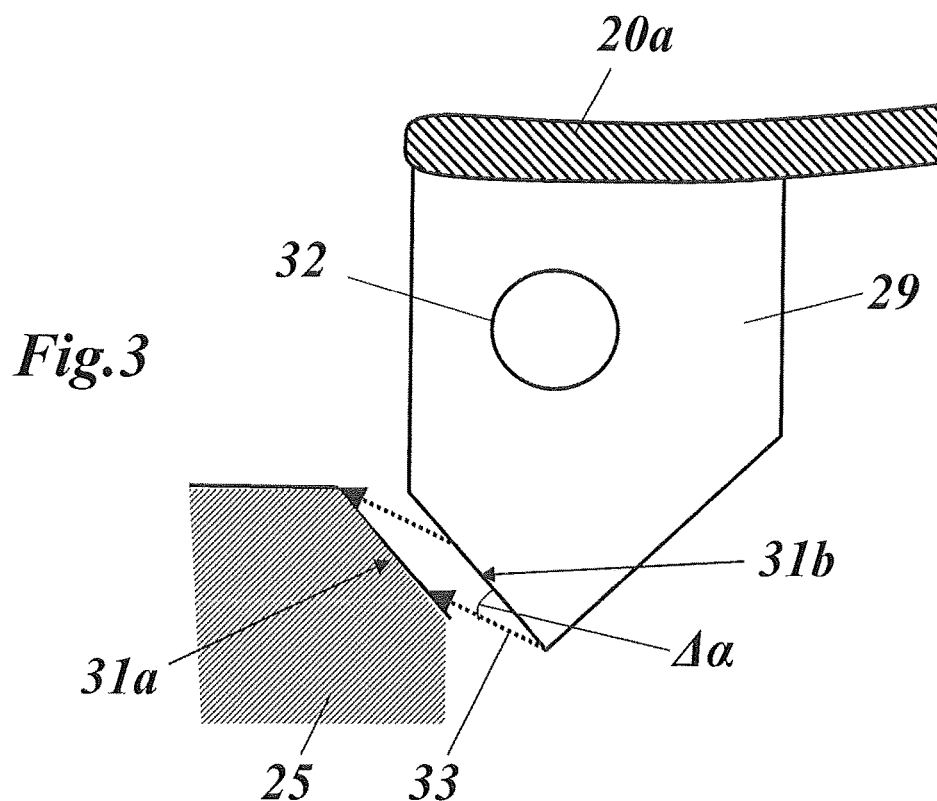
FIG. 3 shows, in a simplified representation, the relative movement between the combustor and the rotor cover or compressor-diffuser on account of the thermal expansion in operation.
Figure 4:
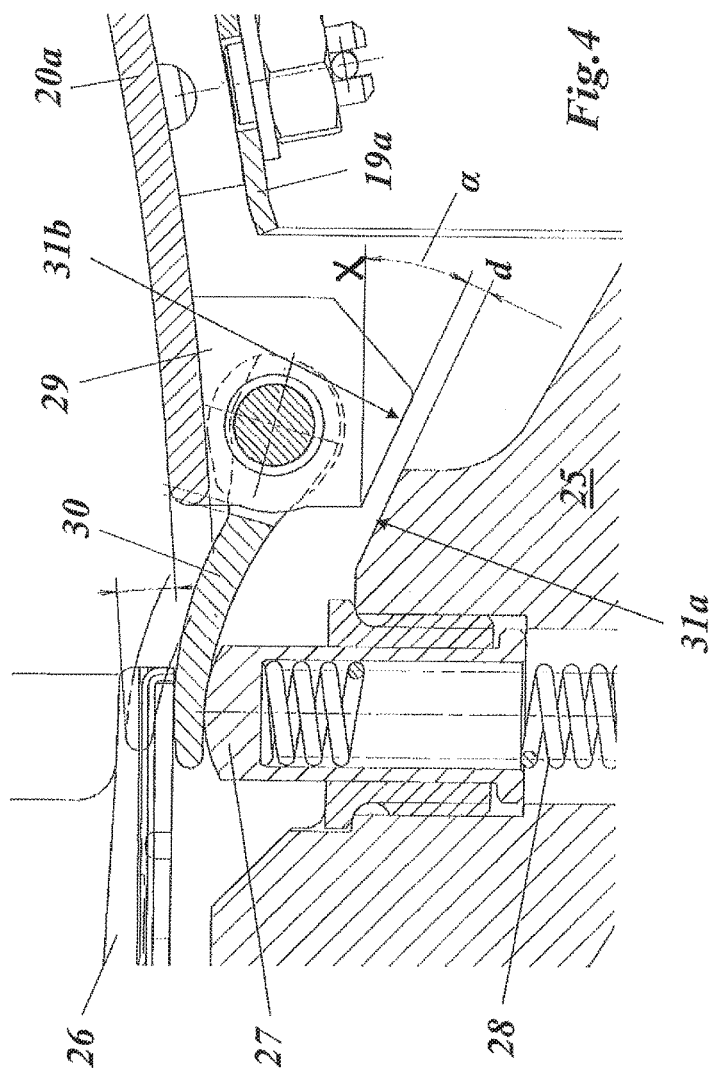
FIG. 4 shows the configuration of the transition region according to one exemplary embodiment of the invention.

The support plates 29 have in each case one bevel (31b in FIG. 4) which, with the machine axis X, encloses a predetermined angle $\alpha$ (see FIG. 4). This bevel 31b lies at a separation d (FIG. 4) opposite a conical contour (31a in FIG. 4) of the rotor cover 25, which contour, with the machine axis X, encloses the same angle $\alpha$. If the combustor undergoes thermal expansion when the gas turbine is started up, the inner combustor shell 20a, with the support plates 29 attached thereto, moves toward the conical contour 31a in the expansion direction 33 indicated in FIG. 3, until finally the two surfaces 31a and 31b are pressed against one another.

In the case of a current gas turbine, the relative radial and axial movements between the interface partners at the interface between the combustor and the turbine inlet were analyzed and a specific sliding plane was then determined. For this use, this specific sliding plane would be approx. 16° and was accordingly taken into account in the design (25° sliding plane).

By means of a simulation of the transient movement in the combustor region with the aid of a FE tool, a specific sliding angle was calculated. An additional movement, perpendicular to the sliding angle, appears on account of the thermal expansion and is used for determining the optimized play. For the various operating states, the FE tool calculated a sliding angle of approximately 15°-18°. Based on these results, it would have been necessary to choose a sliding angle and therefore also a contact angle of less than 20°. Taking into account the mechanical demand that only one contact point per support plate is desired (no area contact, only line contact is desired) and the conical fully round shell should also not ultimately drive up like a bush onto a conical wedge and shrink on, a larger angle was deliberately chosen, in this case an angle of 25°.

Figure 5:
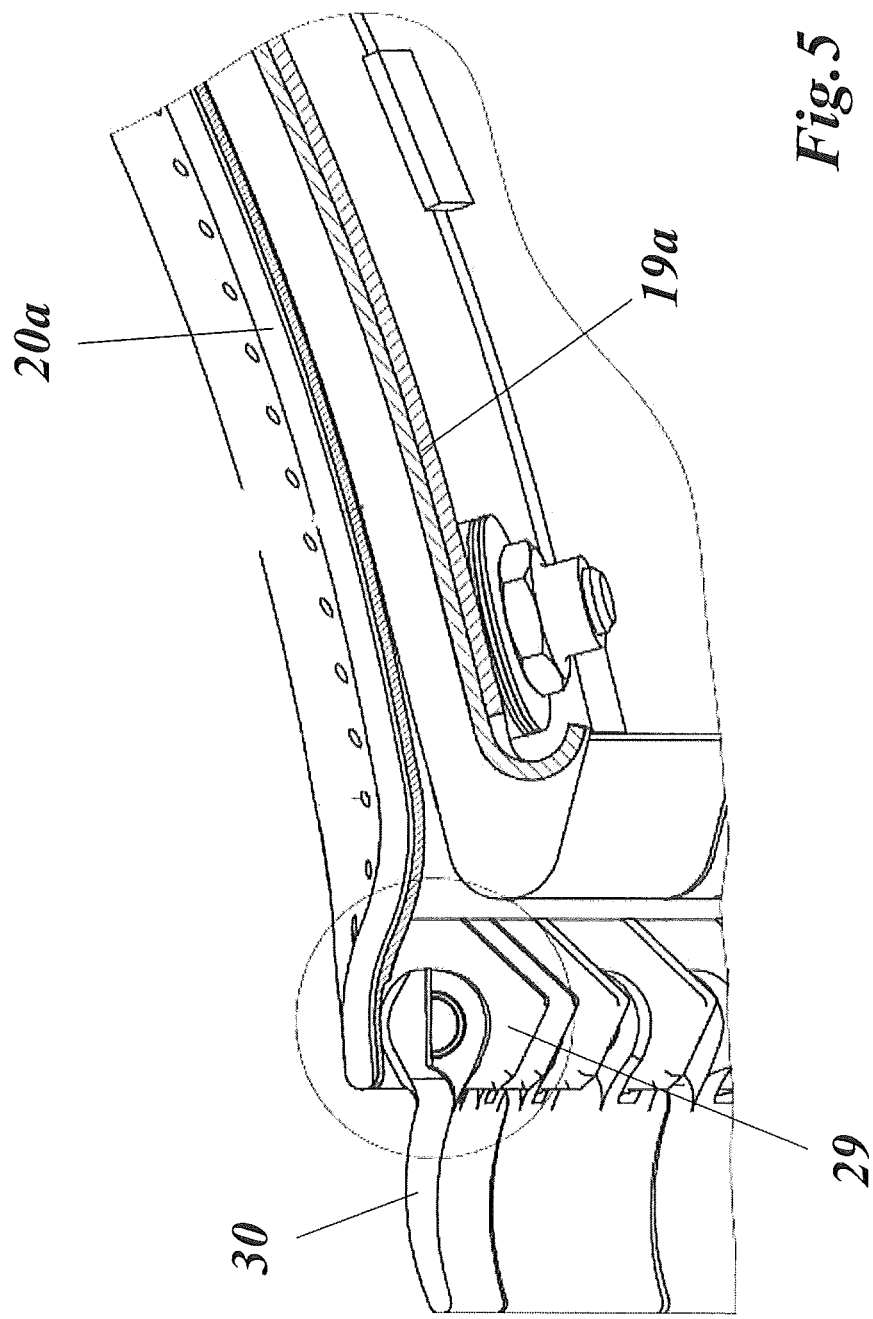
FIG. 5 shows the outlet region of the combustor of FIG. 4 in a perspective representation.

One exemplary embodiment of the configuration of the transition according to the invention is reproduced in FIGS. 4 and 5. The differential angle $\Delta\alpha$, which according to FIG. 3 is enclosed by the expansion direction 33 with the bevel 31$b$ or the sliding surface in the event of thermal expansion, plays an important role in dimensioning the separations and angles.

$\Delta\alpha$ should be in the range from 2°-15°, preferably in the range from 5°-10°, in particular in the range 7°-8°.

The angle $\alpha$ of the bevel 31$b$ with the machine axis is in this case between 20° and 30°, preferably between 24° and 26°.

The installation tolerance, or the separation d, is in the range 1-10 mm, preferably in the range 2-8 mm, in particular in the range 3-4 mm.

The installation tolerance d is in this case equal to the cold clearance plus manufacturing tolerance. A cold clearance is necessary as the parts are assembled blind, so to speak.

As a result of the differential angle $\Delta\alpha$, the components move together when the gas turbine is started up. A slight pressure is necessary. Too large a $\Delta\alpha$ leads to "fretting" of the fins. Too small an angle $\Delta\alpha$ would, in operation, lead to a gap or loose contact. This would allow vibrations and also lead to damage.

The sizes indicated are obtained in particular for gas turbines of the type shown, in which the rotor cover 25 is made of gray cast iron and the material for the fins is selected from among a nickel-based alloy or a preferably austenitic ferritic steel.

For the segmented annular combustors, in this case in particular two fins or support plates are provided per segment.

In the case of refurbishment of an existing gas turbine (retrofit), existing rotor covers are reworked to the angle $\alpha$ and the old fins are replaced with new fins having the angle $\alpha$.

The invention claimed is:

1. A gas turbine, comprising: a combustor comprising a combustor shell and a combustor outlet; a turbine disposed downstream of the combustor, the turbine comprising an inlet separated from the combustor outlet by a transition region, the transition region defining a gap between the combustor and the turbine; and a plurality of support elements fixedly attached along an inner circumference of the combustor shell, each support element comprising a pivot bearing configured to support a pivotable transition element that extends in a direction away from the support element and is configured to movably bridge the gap defined by the transition region between the combustor and the turbine; wherein a rotor cover of the gas turbine defines a conical contour surface that is configured to slideably engage a bevel surface portion of each support element upon thermal expansion of the combustor shell; and further comprising a pressure bolt acted on by a compression spring that is configured to press a free end of the pivotable transition element against a wall of the inlet of the turbine, another end of the pivotable transition element being coupled to the pivot bearing.

2. The gas turbine as claimed in claim 1, wherein each support elements comprises a radially projecting, axially oriented support plates or fins, and wherein the bevel surface portion of the support element is opposite the inner circumference of the combustor shell and the bevel surface portion being complementary to the conical contour surface of the rotor cover, and wherein a non-zero installation tolerance is provided between the conical contour surface and the bevel surface portion.

3. The gas turbine as claimed in claim 2, wherein thermal expansion of the combustion shell occurs in an expansion direction towards the conical contour surface of the rotor cover, and wherein an angle defined by the expansion direction relative to the conical contour surface is a non-zero differential angle.

4. The gas turbine as claimed in claim 3, wherein the non-zero differential angle defined by the expansion direction relative to the contour surface of the rotor cover is in the range between 2° and 15°, and an angle defined by the bevel surface portion of the support element and a machine axis is between 20° and 30°.

5. The gas turbine as claimed in claim 3, wherein the non-zero differential angle is in the range between 2° and 15°, and the angle defined by the bevel surface portion of the support element relative to the machine axis is between 24° and 26°.

6. The gas turbine as claimed in claim 3, wherein the non-zero differential angle is in the range between 5° and 10°, and the angle defined by the bevel surface portion of the support element relative to the machine axis is between 20° and 30°.

7. The gas turbine as claimed in claim 3, wherein the non-zero differential angle is in the range between 5° and 10°, and the angle; defined by the bevel surface portion of the support element relative to the machine axis enclose is between 24° and 26°.

8. The gas turbine as claimed in claim 3, wherein the non-zero differential angle is in the range between 7° and 8°, and the angle defined by the bevel surface portion of the support element relative to the machine axis is between 20° and 30°.

9. The gas turbine as claimed in claim 3, wherein the non-zero differential angle is in the range between 7° and 8°, and the angle; defined by the bevel surface portion of the support element relative to is between 24° and 26°.

10. The gas turbine as claimed in claim 2, wherein the installation tolerance is in the range between 1 millimeters (mm) and 10 mm.

11. The gas turbine as claimed in claim 2, wherein the installation tolerance is in the range between 2 millimeters (mm) and 8 mm.

12. The gas turbine as claimed in claim 2, wherein the installation tolerance is in the range between 3 millimeters (mm) and 4 mm.

13. The gas turbine as claimed in claim 1, wherein the rotor cover is made of gray cast iron and the plurality of support elements consist of a nickel-based alloy or an 18/10-Cr—Ni steel.

14. The gas turbine as claimed in claim 1, wherein the combustor shell is composed of individual segments, and wherein two support elements of the plurality of support elements are provided per individual segment.

15. The gas turbine as claimed in claim 1, wherein a first end of the pivotable transition element is coupled to the pivot bearing and a second end of the pivotable transition element is configured to be pressed against a wall of the inlet of the turbine to bridge the gap defined by the transition region between the combustor and the turbine.

16. The gas turbine according to claim 1 wherein the bevel surface portion of the support element is configured to slide against the conical contour surface of the rotor during thermal expansion and contraction of the combustor shell.

17. The gas turbine according to claim 1 wherein the thermal expansion of the combustor shell causes a movement of the support plate towards the conical contour surface of the rotor cover and a rotation of the pivotable transition element about the pivot bearing towards a wall of the inlet of the turbine.

18. A combustor inner shell for a gas turbine comprising, at an outlet end, on a side facing away from hot gases produced by the gas turbine, a plurality of support elements distributed on a periphery of the combustor inner shell and wherein each support element comprises a bevel surface portion, the bevel surface portion for sliding over a rotor cover conical contour surface during thermal expansion of the combustor inner shell, which defines an angle relative to a machine axis of the gas turbine, and a pivot bearing that supports a pivotable transition element, the pivotable transition element comprising a first end coupled to the pivot bearing and a second unattached end that extends towards the outlet end of the combustor inner shell, and further comprising a pressure bolt acted on by a compression spring that is configured to press the second unattached end of the pivotable transition element against a wall of an inlet of a turbine.

19. A gas turbine comprising a rotor cover, a combustor shell and a turbine inlet,
wherein the rotor cover comprises, at a downstream end, on an outer side, a conical contour surface portion;
wherein the combustor shell comprises a plurality of support elements disposed along a wall of the combustor shell, each support element having a bevel surface portion; wherein each support element further comprises a pivot bearing that is configured to pivotally support a first end of a plate shaped pivotable transition element;
wherein the turbine inlet comprises a wall;
wherein a second end of the plate shaped pivotable transition element is configured to be pressed against the wall of the turbine inlet by a pressure bolt acted on by a compression spring;
and wherein the bevel portion of each support element is configured to slide over the conical contour surface portion of the rotor cover during thermal expansion and contraction of the combustor shell.

\* \* \* \* \*